Oct. 24, 1944. J. B. DICKSON ET AL 2,361,348
PROCESS AND APPARATUS FOR MAKING BALLS
Filed Oct. 12, 1939 3 Sheets-Sheet 1
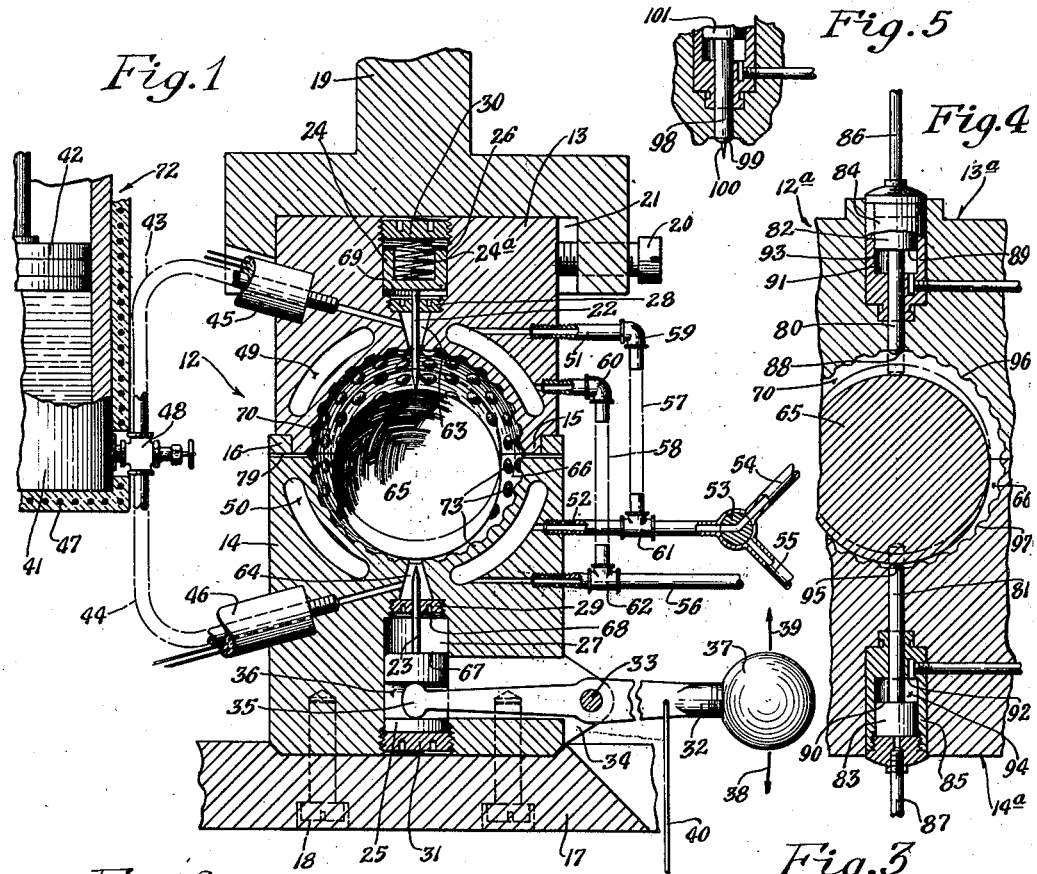
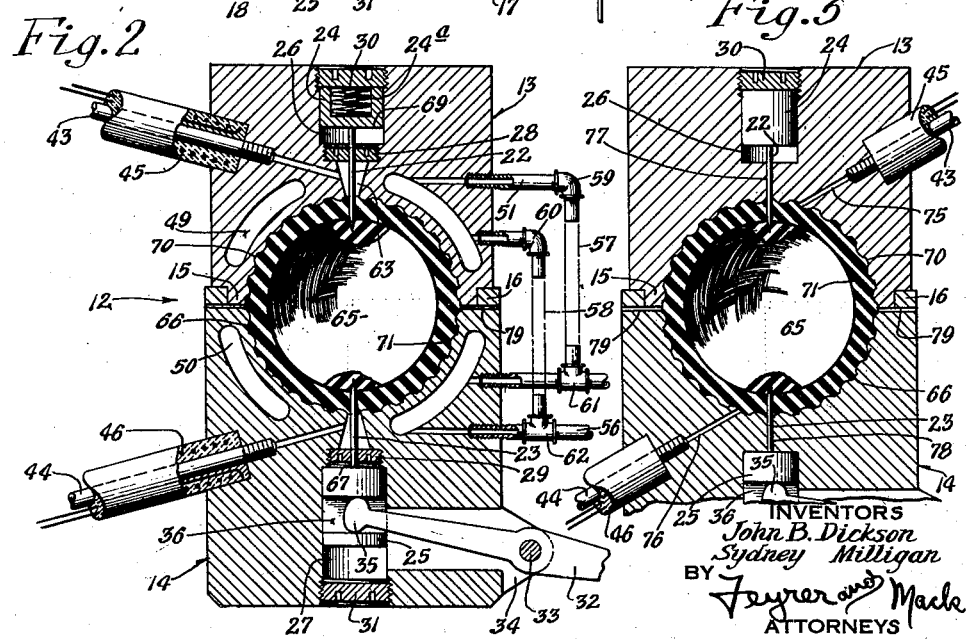
INVENTORS
John B. Dickson
Sydney Milligan
BY Feyrer and Macle
ATTORNEYS INVENTORS
John B. Dickson
Sydney Milligan
BY
ATTORNEYS Oct. 24, 1944.  J. B. DICKSON ET AL  2,361,348
PROCESS AND APPARATUS FOR MAKING BALLS
Filed Oct. 12, 1939  3 Sheets-Sheet 3

INVENTORS
John B. Dickson
Sydney Milligan
BY Feyrer and Mack
ATTORNEYS

Patented Oct. 24, 1944

2,361,348

UNITED STATES PATENT OFFICE 2,361,348

PROCESS AND APPARATUS FOR MAKING BALLS

John B. Dickson, Northampton, and Sydney Milligan, Chicopee, Mass., assignors to A. G. Spalding & Bros. Inc., New York, N. Y., a corporation of Delaware Application October 12, 1939, Serial No. 299,084

22 Claims. (Cl. 18—30)

This invention relates to improvements in methods and apparatus for covering objects, such as balls, and particularly golf balls. Also, it relates to an improved product resulting from the use of said improved method and apparatus.

Heretofore it has been most usual to cover objects, such as ball centers, by a series of operations. The most usual of these well-known procedures was to: (1) form a spherical body, usually a solid rubber core with rubber windings and called the center; (2) separately form a cuplike hemispherical cover blank; (3) form a second hemispherical cuplike cover blank; (4) assemble the two hemispherical cover blanks to the spherical body; (5) place the spherical body and two cover members in a molding die; (6) heat and mold the cover blanks upon the spherical body to the desired final configuration; (7) cool the mold and covered ball; (8) remove the spherical body with the molded cover from the die; and (9) remove the flash line from the molded cover. This extensive series of steps resulted in a costly product. Further, it very often resulted in a product with a cover of uneven thickness, especially if one of the hemispherical members was slightly thicker than the other.

Also, some of these old ways of covering balls required a lengthy time for vulcanization in the mold, which, especially if the material happened to be soft, or became soft in the heated molding die, allowed the ball to settle by gravity within the covering material so that it would finish off-center. The flash, in the old methods, if heavy, and starting to flow from one side of the die, also had a tendency to pull the center to one side of the die.

It is an important object of the present invention to: (1) provide an apparatus capable of economically forming a cover on a body in substantially a single operation; (2) provide a cover on an object which will be uniform in thickness; and (3) eliminate the usual necessity of removing a flash of material around the periphery of the object.

Features resulting from the attainment of these objects include the provision of apparatus which accurately centers a spherical body, such as a ball center, in the geometric center of a die and uniformly with respect to the side walls of the cavity thereof so that the final product is accurately balanced and of high quality.

A further feature, resulting from the attainment of the foregoing objective is the provision of apparatus including plungers adapted to initially centralize and locate the body or center properly within the dies and to subsequently be retracted and located to form surface configurations in the outer surface of the final product.

It is a further object of the present invention to provide an apparatus for economically forming covers on objects. In attaining the present objective the present invention provides an apparatus which may: be quickly opened for the reception of an object such as a ball center; quickly closed; quickly and accurately centralize the object within the die; and quickly mold the entire cover on the object.

To accomplish the last mentioned objective the present invention provides a comparatively simple yet novel die structure capable of accurately locating a body within the die cavity and a novel mechanical and/or hydraulic mechanism for manipulating the same.

Another important object of the present invention is to provide an improved method for molding covers on objects, such as balls.

A feature resulting from the attainment of this object includes the steps of accurately locating and maintaining an object, such as a ball center or any other concentric or irregularly shaped object, in a predetermined position and spaced from the side walls of a cover molding die while partially forming the cover thereon, and then completely molding the cover thereon without removing the object with the partially formed cover from the die and without opening the die.

It is a further object of the present invention to provide an object with an improved cover thereon; viz., an object such as a ball with a cover of uniform thickness throughout and with the center accurately and evenly disposed therein.

A still further object is to provide a product having a cover injection molded thereon of uniform thickness, of like material throughout, of uniform texture and characteristics, of uniform appearance, and without a pronounced flash line.

Other objects, features and advantages will appear hereinafter.

In the drawings:

Figure 1 discloses a sectional view of one form of the present invention, before the cover is molded on the center.

Fig. 2 is a view similar to Fig. 1, but shows the cover molded thereon.

Fig. 3 is a view similar to Fig. 2, but shows the ducts in a different location.

Fig. 4 discloses a modified form of locator pin structure.

Fig. 5 is a modified form of pin preferably used with that form of locator structure shown in Fig. 4.

Figure 6:
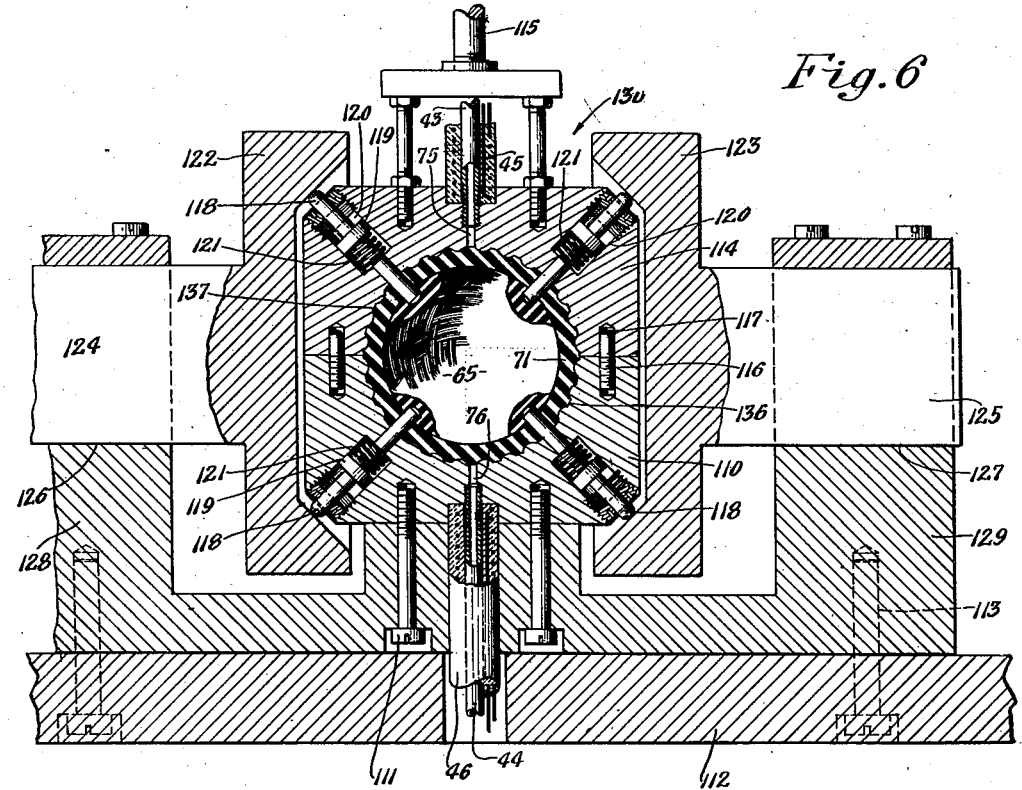

Fig. 6 is a view, largely in section, of a modified form of the present invention, with the locator pins in position to centralize the core.

Figure 7:
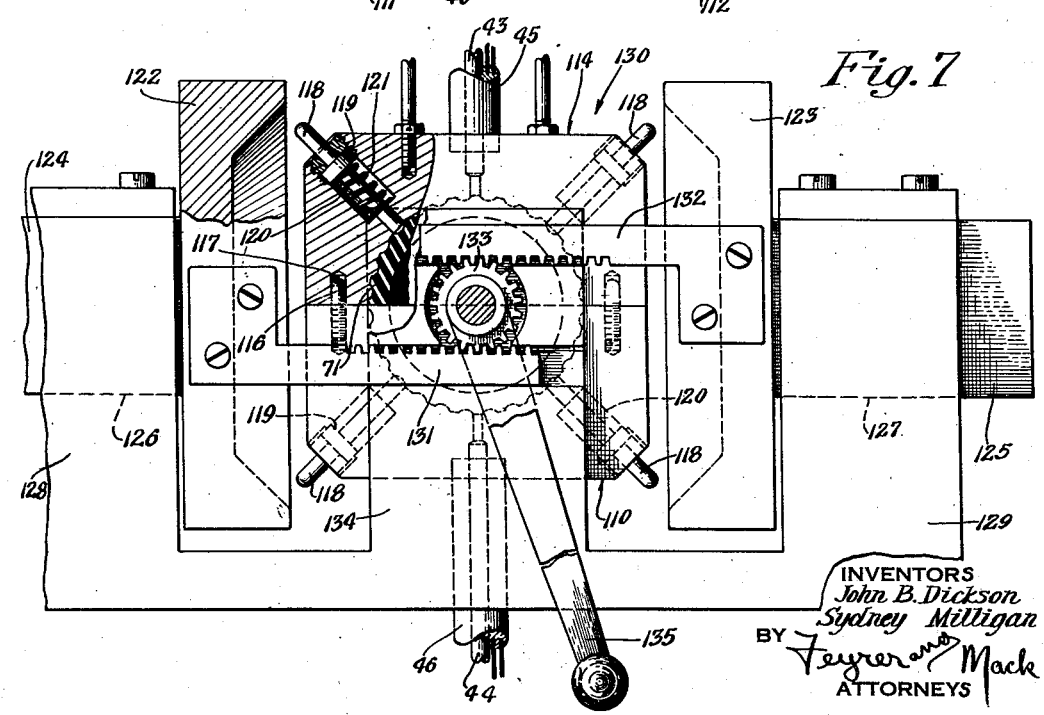

Fig. 7 is a view similar to Fig. 6, but shows the locator pin retracted to form the external surface of the cover.

Figures 8, 9, 10:
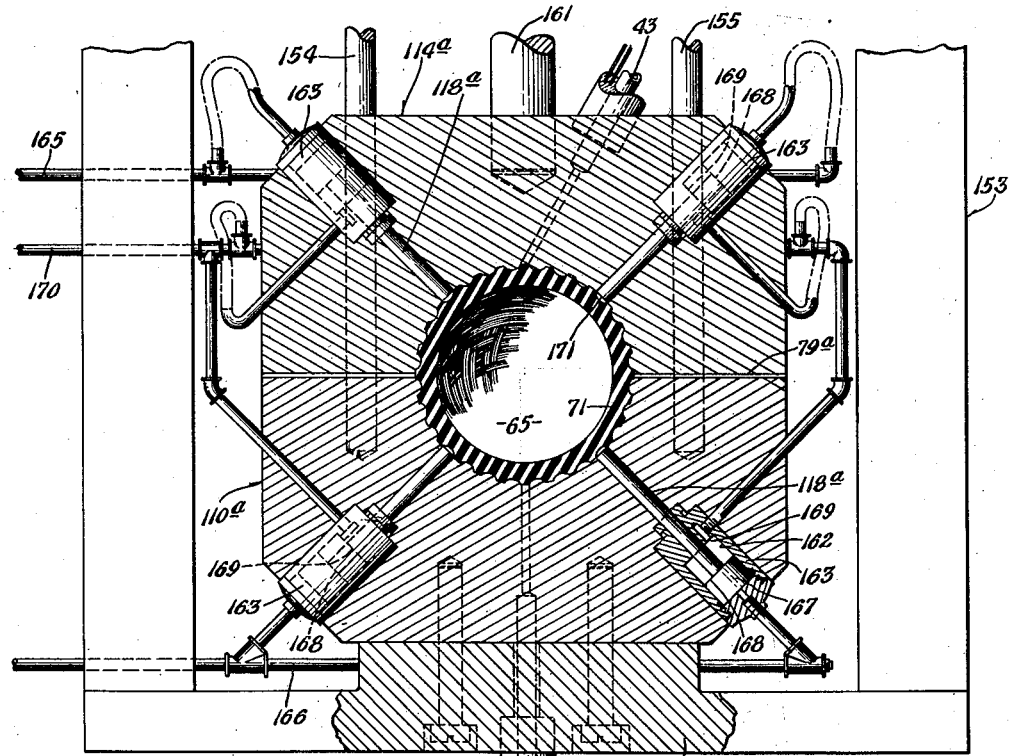

Fig. 8 is a view similar to Fig. 6, but discloses a hydraulic or fluid structure for advancing and retracting the locator pins.

Fig. 9 is a view of the apparatus shown in Fig. 8, on a reduced scale, and showing the die parts in a raised inoperative position.

Fig. 10 is a fragmentary detail of the support used when the apparatus is used in a horizontal plane.

Before describing the present improvements and mode of operation thereof in detail it should be understood that the invention is not limited to the details of construction and arrangement of parts shown in the accompanying drawings, which are merely illustrative of the present preferred embodiments, and the phraseology employed is for the purpose of description and not of limitation.

In the drawings which disclose the present preferred embodiments of the present invention, and referring first to Figs. 1 through 5, inclusive, there is disclosed a combined die 12 including an upper die member 13 and lower die member 14, preferably located relative to each other as by a depending flange 15 and upstanding flange 16.

These die members 13 and 14 might be further located relative to each other in any suitable and well-known press. For example, and as shown in Fig. 1, the lower die member may be secured to any suitable press bed 17 as by screws 18 and the upper die member 13 secured to a ram 19 as by screws 20 clamping the same in a channel 21 at the end of the ram. Any simple and well-known arbor press may be utilized in the manner just set forth, as will readily be appreciated.

Now, of particular importance, it should be noted that the present invention provides upper and lower locator pins 22 and 23 and plungers 24 and 25 in bores 26 and 27 of the die members 13 and 14 respectively. The locator pins 22 and 23 may be integral with the plungers 24 and 25, or may be forced, screwed, riveted or otherwise secured thereto. Guide washers 28 and 29 with suitable holes accommodating the pins 22 and 23 are provided within the bores 26 and 27 to guide and support the pins 22 and 23 in their reciprocatory movement. These washers also serve to prevent the plastic material from entering the bores 26 and 27 which guide the plungers 24 and 25 as pointed out in greater detail hereinafter. Cap screws 30 and 31 are provided in the bores 26 and 27 to limit retracted movement of the plungers 24 and 25.

The lower plunger 25 and associated locator pin 23 may be reciprocated. For this purpose the present invention provides a lever 32 pivoted on a stud 33 located in a tongue 34 section of the lower die 14 which at its inner end is provided with a ball 35 disposed in a slot 36 transverse the plunger 25 and which has a handle 37 at its outer end. The plunger 25 and pin 23 may be reciprocated by merely manipulating the handle 37. Pushing the handle downwardly in the direction of the arrow 38 moves the pin and plunger 23 and 25 upwardly, whereas moving the handle upwardly in the direction of the arrow 39 retracts and lowers the locator pin 23 and plunger 25. Alternatively to the handle 37 the lever 32 may be connected as by a rod 40 to any suitable foot treadle structure.

The dies 13 and 14 are connected to any suitable and well-known injection apparatus, capable of forcing molding material under pressure to the die, as shown diagrammatically by the cylinder 41 and plunger 42 in Fig. 1. Connections with such injection apparatus are preferably made with any suitable and well-known flexible conduits 43 and 44 which may be surrounded by closed electrical heating coils 45 and 46 to maintain the molding material in a fluid or semi-fluid state from the injection apparatus to the die. Similar heating means 47 in connection with the cylinder 41 are diagrammatically shown in Fig. 1. Flow of the molding material from the cylinder 41 to the combined die 12 is controlled by the plunger 42 and valve 48.

Both the upper and/or lower die members 13 and 14 may be heated and/or cooled according to any of the now well-known structures or ways when molding. A simple disclosure to this end is shown in Fig. 1 which includes cavities 49 and 50 of suitable size formed in the dies 13 and 14, which through suitable conduits 51 and 52 extend to a valve 53 connected to a source of steam or hot water through the conduit 54 and from the same valve 53 through a conduit 55 connected to a suitable source of cool or cold water or the like.

A conduit 56 is provided to pass off the steam and/or cold water projected in through the cavities. Preferably the conduits 57 and 58 extending between the L's 59 and 60 and T's 61 and 62 are flexible to permit the upper die 13 to be moved into and out of the operative position shown in Fig. 1.

When the valve 53 is in the position shown in Fig. 1 steam is admitted to the cavities 49 and 50 of both the upper and lower die; and, when the valve is turned counterclockwise approximately 120° from the position there shown, cold water will be admitted to both cavities, to cool the dies. In an intermediate position the valve closes off both the heating and cooling mediums.

Normally, the molding material is preferably one which may be rendered plastic in the cylinder 41 and forced in its plastic state into the die 12 by the plunger 42 where the normal unheated and uncooled die causes the material to congeal and form the cover. Exposure of the die cavities to the air as the dies are opened to remove the covered object, and to place a new body or center ordinarily keeps the dies sufficiently cool to offset a cooling, congealing or hardening of the molding material. However, if the dies become too warm, with the structure just described in detail, it is possible to have a continuous flow of cool water through the cavities 49 and 50; or, if the molding material is of granule or pulverized form, or otherwise of a type which requires heating and cooling in the die such heating and cooling is effected with the structure and in the manner hereinbefore described in detail.

As shown in Figs. 1 and 2, the conduits 43 and 44 extend to outlet ports 63 and 64 which direct the molding material into the die. The arrangement is such that plastic material is uniformly injected through the outlet ports 63 and 64 to both sides of the body 65, ball center or other object within the die, and so that the molding material is uniformly distributed over the entire center therein. Further, the arrangement is such that the material is not more quickly cooled at any one point than another, so that the cover when molded thereon is of uniform texture and quality.

Operation of the apparatus just described in detail is as follows: The upper die is retracted until the ram 19 is moved a sufficient extent to permit dropping an object 65, such as a ball center or body, into a cavity 66 section of the lower die 14. The concave shape of this cavity quickly centralizes the object 65 relative to the side walls or general cuplike shape of the cavity. Thereafter, the upper die is moved to the closed position shown in Fig. 1 whereupon the pin 22 rests upon or slightly enters the top center of the object or core 65. Next, the operator moves the lever 32 in a clockwise direction as viewed in Fig. 2 either by pressing down on the handle 37 or by manipulating a usual foot treadle connected thereto by a link 40 whereupon the lower pin 23 engages the lower center section of the body 65 and in cooperation with the upper pin 22 thereby prevents lateral shifting thereof in the die. The locator pin 23 and plunger 25 are moved upwardly in the bore 27 until movement is stopped by the face 67 engaging a shoulder 68. Concurrently the body 65 and pin 22 are moved upwardly until the plunger 24 engages the stop screw 30. Location of the stop screw 30 and the length of the point of the pin 22 relative to the face 69 of the plunger 24 is such that it projects into the die cavity 70 the same extent as the pin 23 when the plunger 25 engages the stop shoulder 68. Thus, the locator pins 22 and 23 enter the bore or die cavity an equal extent when the plunger 25 is moved up to the stop shoulder 68, so that the two pins 22 and 23 serve to centralize the body 65 vertically in the die as well as laterally or transversely thereof, as may be seen best by viewing Fig. 2. A spring 24a may be provided to normally maintain and force the locator 22 in the lowered position. Preferably, it is comparatively light so that pressure of the lever 32 is greater and causes the plungers 24 and 25 to engage cap 30 and shoulder 68 respectively.

After the body 65 is centralized by the pins 22 and 23 in the manner just described, molding material may be injected through the conduits 43 and 44 and outlet ports 63 and 64 to form a complete cover 71 around the body 65 which is centrally disposed therein. Normally the interior of the dies 13 and 14 are somewhat cooler than the molding material projected therein so that the latter is congealed to form a cover. The molding material may be of any suitable type and may be injected therein by any suitable and well-known type of injection molding apparatus 72, disclosed diagrammatically in Fig. 1, by operating a valve 48 which opens and closes the flow of molding material to the combined die 12 and which is forced thereto from the cylinder 41 as by a plunger 42. Supplemental heating and/or cooling of the die at the time of molding the cover may be effected as hereinbefore described in detail if preferred; however, this is ordinarily not necessary.

After the cover is injection molded therein as just described the upper die 13 may be raised relative to the lower die, preferably a slightly greater extent vertically than the diameter of the finished ball. As the plastic material cools and congeals to form the cover it grows slightly smaller in diameter so that it is easily separated from the cavities 70 and 66 of the upper and lower dies 13 and 14 respectively. Should any tip remain on the cover at the point where the same is separated from the outlet ports 63 and 64 the same would be of very small size and could be very easily removed. The same would be much less in size and much less apparent than a flash line extending completely around the ball as occurs in present day molding operations when two cuplike members are placed upon and molded to a center with the surplusage adversely squashing between the two die parts. The cavities 66 and 70 may be provided with dimples or any other suitable configurations 73 as indicated now in Figs. 1 and 2.

During the molding operation and prior to opening or raising the die 13 relative to the lower die 14 the lever 32 may be moved in a counterclockwise direction in order to retract the locator pin 23 and thereby completely mold the lower side of the ball; viz., mold it without even a slight pin hole appearing therein. This can be done either before or after the valve 48 is closed and prior to retracting or lifting the upper die.

Fig. 3 discloses an apparatus differing from Figs. 1 and 2 primarily in the provision of outlet ducts 75 and 76 extending to the cavities 70 and 66 at a point different from the locator pins 22 and 23 so that these pins may be more sturdily supported in suitable guide holes 77 and 78 directly in the die members 13 and 14 instead of in separate guide washers 28 and 29. A suitable air vent or vents may be provided in the die 12 one such being shown at 79 in Fig. 1.

Fig. 4 is a fragmentary view of a slightly different locator pin arrangement. It differs from the locator pins 22 and 23 of Figs. 1 and 2 primarily in the provision of larger locator pins 80 and 81 connected to plungers 82 and 83 in hydraulic cylinders 84 and 85. When a fluid is projected through lines 86 and 87 to the outer ends of the cylinders 84 and 85 the locator pins 80 and 81 are forced toward the body or center 65 in order to grip and move it into the position shown in Fig. 2. Preferably the feed line or conduit 86 is made much shorter than the line 87 so that the end 88 of the upper pin 80 engages the top center of the body 65 before the lower pin 81 is moved upwardly. However, after the valve is opened a short time both pins are moved toward the center of the die cavities 66 and 70 an equal extent through the shoulders 89 and 90 of the plungers 82 and 83 engaging the shoulders 91 and 92 of cylinders 84 and 85 respectively. These pins are allowed to remain in this position and hold the body 65 centrally in the die 12a until the molding material is injected therein substantially the same as shown in Fig. 2.

Thereafter, and while the cover material serves to hold the body in the central position, the pins 80 and 81 are retracted by turning the valve 120° and thereby directing fluid to the inner ends of the bores 93 and 94 to retract the plungers 82 and 83 and associated pins 80 and 81 until just the rounded ends 88 and 95 thereof project into the die cavities in which position said round ends serve to form a dimple or other configuration on the outer surface of the ball complementary to those dimples or like configurations made by projections 96 and 97 directly upon the die members 13a and 14a. Thus, it will be seen that the pins 80 and 81 serve to: centralize the body 65 in the die cavities 66 and 70; hold the body 65 in the central position until a cover is molded thereon; and form surface configurations on the exterior of the molded cover. Preferably the valve 48 of the injection molding apparatus 72 is left open until the pins 80 and 81 are retracted in order to fill the space that would normally be created by a retraction of the pins.

If preferred, and as shown in Fig. 5, the pins 80 and 81 of Fig. 4 may be replaced by modified pins, such as the pin 98, having rounded ends 99 and pointed ends 100 thereon in order to better or more accurately grip the body 65. These pointed ends 100 are preferably very short so that they do not extend through the cover when the pins are retracted by the plungers 101 a sufficient extent for the rounded ends 99 to form the dimples. Only by carefully examining all the dimples would it be possible to locate a small pin point at the bottom of two of the dimple cavities and even these slight pin points might be closed if the material is resilient, or if it is not greatly congealed when the finished ball is removed from the die. The rounded ends 88 and 95 on the pins 80 and 81 may be of concave rather than convex form if the cavities 70 and 66 are plain, whereupon the pin ends would aid or serve to form a smooth cover.

Operation of the complete die assembly with the locator pin structure shown in Figs. 4 and 5 is just the same as described in connection with Figs. 1 and 2.

Figs. 6 and 7 disclose a modified form of the present invention, which, however, includes many of the principles described in connection with that form of the invention disclosed in Figs. 1 and 5. Referring now in detail to the form disclosed in Figs. 6 and 7 the present invention provides a lower die 110 secured to a substantially U-shaped base as by fillister head screws 111 which in turn is secured to any usual bed of any usual press 112 as by screws 113.

A cooperating upper die 114 is associated with the lower die and may be reciprocated relative thereto by a ram 115. The ram 115 and bed 112 may be conventional and well-known parts of usual arbor or other presses and are, therefore, not disclosed in detail. The upper and lower dies may be more accurately located relative to each other through the provision of upstanding studs 116 on the lower die entering suitable apertures 117 in the upper die.

Now, of particular importance, both the upper and lower dies 114 and 110 are provided with a series of locator pins 118 carried by plungers 119 reciprocable in bores 120. Preferably the upper and lower dies 114 and 110 are of substantially rectangular form and are preferably provided with bores 120 in all four corners thereof so that the total of four locator pins 118 are provided in each of the upper and lower dies. Coil springs 121 are provided within the bore 120 and underlying the plungers 119 to normally retain each of the locator pins in the retracted positions shown in the upper left-hand corner of Fig. 7. However, drive plates 122 and 123 with shanks 124 and 125 journaled in channels 126 and 127 of upstanding arms 128 and 129 are provided to uniformly move the locator pins 118 to the closed or centralizing position shown in Fig. 6.

To insure a uniform movement of the drive plates 122 and 123 concurrently toward the die 130 the present invention provides racks 131 and 132 secured to the drive plates 122 and 123 respectively engaging with a spur gear 133 journaled in an upstanding lug 134 and rotatable as by a crank 135. Thus, as the crank 135 is rotated in a counterclockwise direction as viewed in Fig. 7 the drive plates move toward the outer ends of the locator pins 118 and drive the same inwardly of the die cavities 136 and 137 to the position shown in Fig. 6 whereupon the eight pins entering the die cavities uniformly serve to accurately locate the body or center 65 within the cavities 136 and 137.

Conduits 43 and 44 extending to outlet ports 75 and 76 are connected to any suitable injection molding apparatus, for example, the apparatus 72 shown diagrammatically in connection with Fig. 1, to conduct a molding material to suitable places in the die cavities 136 and 137, e. g., the top and bottom centers of the cavities 137 and 136 respectively. Also, suitable heating means 45 and 46 may be provided around the conduits 43 and 44. Further, suitable die heating and/or cooling means such as that described in detail in connection with Figs. 1 and 2 may be provided. However, for clarity, a detailed showing thereof is not made in Figs. 6 and 7.

Operation of this form of apparatus includes: retracting the drive plates 122 and 123 to the position shown in Fig. 7 as by the crank 135 and raising the upper die 114 a substantial extent above the lower die 110 as by the ram 115; placing a body 65, such as a ball center in the lower die cavity 136; moving the upper die into the closed position shown in Figs. 1 and 2 as by the ram 115; moving the locator pins to the closed position shown in Fig. 6 by concurrently moving the drive plates 122 and 123 from the position shown in Fig. 7 to the position shown in Fig. 6 in order to accurately centralize the body 65 relative to the die cavities 136 and 137; injection molding a cover 71 substantially around the body 65 as shown in Fig. 6; retracting the locator pins 118, by moving the drive plates toward the upstanding arms 128 and 129 so that the pins 118 take the position shown in Fig. 7 and serve to form the external configuration of the cover; stopping the injection molding and allowing the cover stock to congeal; opening the die and removing the completed covered object therefrom. This form of apparatus insures a very accurately made product with the body positively centralized therein and with the cover of uniform thickness and structure throughout. Any suitable air vent similar to the air vent of Fig. 1 may be provided in the apparatus of Figs. 6 and 7.

Figs. 8 and 9 disclose another modified form of the present invention closest to that form shown in Figs. 6 and 7 and just described in detail. It differs from the latter structure primarily in the provision of hydraulic or fluid means 147 including a pump 148 drawing fluid from a sump 149 and concentrating the same in a pressure chamber 150, for operating the locator pins 118a. Briefly it may be described as including a lower die 110a secured by fillister head screws 151 to the lower part 152 of an O-shaped frame 153 and with an upper die 114a mounted for reciprocatory movement on slide rods 154 and 155. A two-way hydraulic piston 156 is secured to the crossbar 157 of the frame 153 to move the upper die into the raised position shown in Fig. 9 when fluid is directed from the line 158 through a pipe 159 to the lower side of the piston 156, and to force the same downwardly into the closed position shown in Fig. 8 when the valve 160 is positioned to direct fluid through the pipe 159' to the upper end of the piston. A rod 161 connects the upper die to a conventional plunger within the cylinder 156. This frame and hydraulic control of the upper die, just described in detail, may also be used in connection with the apparatus disclosed in Figs. 1 through 7 hereinbefore as will be readily appreciated. The upper and lower dies 114a and 110a may be provided with cavities 136 and 137 having dimples 138 or other desired configurations formed therein, much the same as described in connection with Figs. 1 through 7 hereinbefore.

The molding material may be conducted to the cavities 136 and 137 forming the die 130a as through conduits 43 and 44 connected to any suitable injection molding apparatus, for example as shown diagrammatically at 72 in Fig. 1. Preferably, outlet ports 75 and 76 for these conduits 43 and 44 are directed to or near the center top and center bottom of the cavities 137 and 136 of the upper and lower dies 114a and 110a respectively. A shallow air duct 79a may be provided to clear air from the die cavities, as the molding material is injected. Preferably, this air duct is on the meeting face of one, or both dies, so that excess molding material may be readily cleared therefrom.

Particular attention is directed to the locator pins 118a in this form of the invention, reciprocably mounted in bores 162 of cylinders 163. Fluid may be passed from the feed line 158 to the valve 164 and thence through the pipes 165 and 166 be directed to the outer ends of the cylinders 163 to force the piston or plunger 167 with the associated locator pins 118a inwardly to accurately centralize the body 65 within the die, after such a body 65 is placed in the cavity 136 of the lower die 110a and the upper die 114a is moved to the closed or operative position. The locator pins 118a, shoulders 168 on the plungers 167, and faces 169 in the bores 162 are all proportioned so that the rounded ends of all the locator pins enter the die cavities 136 and 137 an equal extent when the shoulders 168 engages the faces 169, to positively locate or centralize the body 65 in the die at the time the outer ends of all the cylinders 163 are filled with fluid. The molding material is then injected into the die 130a to uniformly form a cover 77 around the body 65 and around the ends of the locator pins when they are positioned substantially as shown in Fig. 6. Thereafter, the locator pins are withdrawn by turning the valve 164 so that it conducts the fluid to the inner ends of the pistons 163 through pipe 170 to retract the plungers 167 and associated locator pins 118a until they assume the position shown in Fig. 8, whereupon the injection molded material completely covers the body and whereupon the curved or otherwise shaped end 171 of the locator pins serve to form the desired configuration to the outer surface of the body immediately thereunder. When the ball or other object is completely molded the upper die may be retracted to remove the same from the die.

Heating and/or cooling of the dies 110a and 114a may be effected by the usual and well-known heating and cooling means for molding dies, such as has been described in considerable detail in connection with Figs. 1 and 2. However, because the cavities 136 and 137 of the dies 110a and 114a are normally considerably cooler than the plastic material passing through the heated conduits 43 and 44 there is a considerable congealing and hardening of the molding material after it is injected into the die so that supplemental heating and/or cooling is ordinarily not necessary. Only in connection with certain classes of molding material is supplemental heating and/or cooling necessary. Because of the congealing of this molding material in the combined die there is a separation of the cover therefrom so that the ball or other object being covered therein may be easily removed when the upper die is retracted to the open position shown in Fig. 9.

The improved method provided by the present invention includes the steps of locating a body in a die in spaced relationship to the side wall thereof; molding a cover on the object while it is so held; at least partially removing the holding means and completing the cover; and then removing the body with the completed cover thereon.

In another and more highly developed form the present invention provides an improved method including the steps of accurately locating or centralizing a body within a die cavity; holding the body in a predetermined position in the die with a plurality of pins; molding the cover in large part around the body; removing or retracting one or more of said pins; completing the cover in those sections previously occupied by the pin or pins; and removing the completed ball from the die.

The term "centralizing" as used herein is intended to mean both moving the body to the geometric center of the cavity and moving it exactly into a preferred predetermined location even though this be to one side or the other of the cavity. The latter is accomplished by merely varying the length or position of the locator members relative to each other and to the cavity.

The body or center 65, may be a concentric article, such as a center for a golf ball, or may be some other irregularly shaped member. Various well-known molding materials may be used.

Vents, such as the vents 79 and 79a of Figs. 1, 2, 3 and 8, are preferably provided in all the dies of the present invention, but may be of larger or smaller size and may be variously located as will be readily understood. In many instances they may be dispensed with entirely as there is a sufficient escape of air between the regular flat faces of the mating dies. Conduits and ducts for conducting molding material, such as the conduits 43 and 44 and the outlet ports 75 and 76, are proportioned according to the kind and amount of material which is to be directed therethrough. The springs 24a and 121 and the cylinders 84 or 163 for operating the locator members 22, 80 and 118a respectively are properly proportioned to handle the working loads which will be imposed thereon, as will be appreciated.

Although the apparatus is shown in a vertical plane, it may be in a horizontal plane in which event a simple button 173 with a slightly concave top 174 is provided serving as a shelf to initially support the core or center 65 when the die is loaded, as shown by dot-and-dash lines 65' in Fig. 10. After the center is so loaded the movable die member (such as 114b) may be closed and pins (such as 118 and 118a) moved into the operative position to positively centralize the core or center.

The various mating dies hereinbefore described in detail may mold covers on more than one object at a time, as will be readily appreciated, by providing a plurality of molding cavities in sufficiently large main die blocks.

Any of the well-known knockout mechanisms may be provided. In that form of the invention shown in Figs. 4 through 10, inclusive, the regular locator and forming pin, such as 80, 81, 98, 118 and 118a may be used to knock out the finished product by merely driving the same toward the center after the die halves have been opened or separated.

Further variations and modifications may be made within the scope of this invention and portions of the improvements may be used without others.

Having thus described the invention, what is claimed as new is:

1. In an apparatus for molding a cover upon a body, the combination of separable dies having closed and open positions relative to each other, with at least one cavity; a plurality of generally opposed locator members positioned to alone grip and move the body into a predetermined position in the cavity; actuating means including a single member operable for concurrently operating said locator members while the dies are in closed position relative to each other; and means for directing molding material to the cavity.

2. In an apparatus for molding a cover upon a body, the combination of a die member, with a cavity; a second die member, with a cavity; means for closing said die members relative to each other; a plurality of locator members positioned in said die members for gripping and moving said body into a predetermined position relative to said cavities; actuating means including a single member operable for concurrently moving said locator members while said die members are closed relative to each other; and means for directing molding material to said cavities.

3. In an apparatus for molding a cover upon a body, the combination of separable dies having closed and open positions relative to each other, with at least one cavity; a plurality of unitarily actuated lifting and stop means for moving the body and for positively locating the same both horizontally and vertically relative to the cavity while the dies are in closed position relative to each other; and means for directing molding material to the cavity.

4. In an apparatus for molding a cover on an object the combination of an upper die; a lower die; means for moving said die members relative to each other; at least one locator member in said upper die member; at least one locator member in said lower die member; and unitary means for moving said plurality of locator members to lift said object and to locate and maintain the same in a predetermined position rigidly within said die members.

5. In an apparatus for molding, the combination of separable dies, with at least one cavity; means for closing said separable dies; slidable plungers for gripping the exterior of a body; means for moving the slidable plungers and body to a predetermined location vertically and horizontally within the dies; means for injecting molding material between the body and the cavity to form a molded cover; and means on said slidable plungers, complementing said cavity, to form the normal exterior of a cover on the body when the slidable plungers are withdrawn from said body and while the separable dies are closed.

6. In an apparatus for molding a cover on a body, the combination of separable dies with cavities; means for closing the separable dies; locator members alone capable of moving and centralizing the body horizontally and vertically within the cavities; unitary means for operating said locator members after the separable dies are closed; means for directing molding material between the body and the die cavities to form a cover; and means on said locator member, complementing said cavities, to form the normal exterior of a cover on the body when the locator members are withdrawn from said body and while the separable dies are closed.

7. In an apparatus for molding, the combination of an upper die, with a cavity for receiving a body; a lower die, with a cavity; a semi-floating locator member associated with the upper die; a controlled locator member associated with the lower die; means for operating the latter locator member to lift said body vertically; and stop means for locating said floating and controlled locator members in a predetermined position.

8. In an apparatus for molding, the combination of an upper die, with a cavity; a lower die, with a cavity for locating a body laterally; a pair of locator members adapted to grip the top and bottom of said body; means including a single member operable for moving said pair of locator members, with the body, vertically, to a predetermined position with respect to the cavities; and means for directing molding material into said cavities.

9. In an apparatus for molding, the combination of separable dies having closed and open positions relative to each other, with at least one cavity adapted to receive a body; at least two locator members positioned to engage and lift said body in the cavity to a predetermined position therein; means including a single member operable for operating all of said locator members while the dies are in closed position relative to each other; and means for directing molding material to the cavity.

10. In an apparatus for molding, the combination of separable dies, with at least one cavity adapted to receive a body; at least two locator members adapted to engage and move said body to a predetermined position in the cavity; means for operating said locator members; a shouldered pin on at least one of said locator members, the shoulder being in such a position as to form a part of the wall of the die cavity when the locator members are withdrawn and shaped to form the normal exterior of the product; and means for directing molding material to the cavity.

11. In an apparatus for molding, the combination of an upper die, with a cavity; a lower die, with a cavity for locating a body laterally; a pair of locator members, having advanced body locating and retracted cover forming positions, adapted to grip the top and bottom of said body; means including a single member operable for moving said pair of locator members, with the body, vertically, to a predetermined position relative to the cavities; and means for directing molding material into said cavities.

12. In an apparatus for molding, the combination of separable dies, with at least one cavity; means for closing said separable dies; locator members for gripping a body; hydraulically operated means for moving the locator members, and the body engaged thereby, vertically into a predetermined position within the cavity; and means for directing molding material to said cavity.

13. In an apparatus for molding, the combination of separable dies, with at least one cavity; means for closing said separable dies; locator members; hydraulically operated means for moving the locator members to advanced and retracted positions relative to the cavity; means on said locator members when in the retracted position for forming the exterior of a cover on the body; and means for directing molding material to the cavity.

14. In an apparatus for molding covers on bodies, the combination of an upper die; a lower die; a locator member in said lower die member; a locator member in said upper die member; means for moving said die members relative to each other and concurrently moving one of said locator members onto a body in the cavity; means for subsequently operating the other locator member; and means for injection molding a cover around said core supported by said locator pins.

15. The method of molding a cover on a body in a die including the steps of locating the body laterally relative to the molding die; moving the body vertically to a predetermined position in the die while positively holding the body in the located position laterally relative to the die; maintaining it in the predetermined position while partially molding a cover thereon; and then completely molding the cover thereon.

16. The method consisting of the steps of gripping a body only with a plurality of locator pins and moving the same by said locator pins alone to a predetermined centered location in the die; forming a partial cover in large part around said body; retracting the locator pins and then maintaining said body by the partially molded cover to complete the molding of said cover; removing the covered body from the die.

17. In an apparatus for molding, the combination of separable dies, with at least one cavity; means for closing said separable dies; slidable plungers for gripping the exterior of a body; means including a single member operable for moving the slidable plungers to a predetermined location vertically and horizontally within the dies; stops for limiting movement of said slidable plungers into predetermined retracted positions; means for injecting molding material between the body and the cavity to form a molded cover; and means on said slidable plungers, complementing said cavity, to form the normal exterior of a cover on the body when the slidable plungers are withdrawn from said body and while the separable dies are closed.

18. In an apparatus for molding, the combination of separable dies, with at least one cavity; means for closing said separable dies; slidable plungers for gripping the exterior of a body within the cavity; actuating means including a single member operable for concurrently moving all of the slidable plungers to a predetermined location vertically and horizontally within the dies; means for injecting molding material between the body and the cavity to form a molded cover; and means on said slidable plungers, complementing said cavity, to form the normal exterior of a cover on the body when the slidable plungers are withdrawn from said body and while the separable dies are closed.

19. In an apparatus for molding, the combination of separable dies, with at least one cavity; means for closing said separable dies; slidable plungers for gripping the exterior of a body within the cavity; gear-and-rack means for concurrently moving all of the slidable plungers to a predetermined location vertically and horizontally within the dies; means for injecting molding material between the body and the cavity to form a molded cover; and means on said slidable plungers, complementing said cavity, to form the normal exterior of a cover on the body when the slidable plungers are withdrawn from said body and while the separable dies are closed.

20. In an apparatus for molding, the combination of separable dies, with at least one cavity adapted to receive a body; at least two generally opposed locator members in at least two of said separable dies, adapted to grip an object, prevent lateral movement thereof in the cavity, and to lift the object into a predetermined centered position therein; and means for directing molding material into said cavity.

21. In an apparatus for molding a cover on a body, the combination of separable dies having a cavity therein; means associated with said separable dies for initially supporting and locating the body in a predetermined position horizontally with respect to the separable dies, said means including a plurality of pairs of opposed locator members for positively holding said body in said predetermined position horizontally with respect to the separable dies while moving the same to a predetermined position vertically in and with respect to the cavity; and means for moving said locator members.

22. In an apparatus for molding, the combination of separable dies having closed and open positions relative to each other, defining a spherical cavity; means for closing said separable dies; a plurality of slidable plungers for gripping the exterior of each hemisphere of a spherical body within the spherical cavity; unitary means for moving the slidable plungers and the body in a substantially straight line direction to a predetermined location while the dies are in closed position relative to each other; and means for directing molding material to the cavity.

JOHN B. DICKSON.
SYDNEY MILLIGAN.